May 19, 1936.  W. S. SMITH ET AL  2,041,269
INSULATED ELECTRICAL CONDUCTOR
Original Filed Dec. 1, 1930
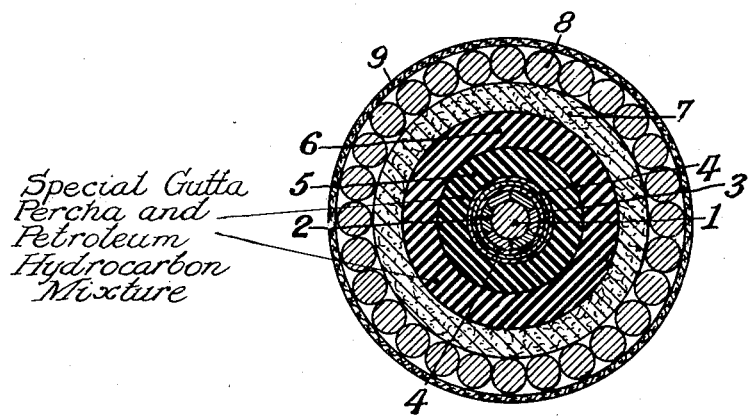
Special Gutta
Percha and
Petroleum
Hydrocarbon
Mixture
Inventors:
Willoughby Statham Smith,
Henry Joseph Garnett, and
John Norman Dean;
By their attorneys,
Baldwin & Wright Patented May 19, 1936

2,041,269

UNITED STATES PATENT OFFICE 2,041,269

INSULATED ELECTRICAL CONDUCTOR

Willoughby Statham Smith, Benchams, Newton Poppleford, Henry Joseph Garnett, Lymne, Solefields, Sevenoaks, and John Norman Dean, Orpington, England Original application December 1, 1930, Serial No. 499,406. Divided and this application October 11, 1933, Serial No. 693,216. In Great Britain and Irish Free State December 6, 1929

8 Claims. (Cl. 173—264)

(This application is a division of our application No. 499,406 filed 1st December, 1930.)

This invention relates to signalling cables and more particularly to submarine telegraph and telephone conductors having an insulation comprising gutta percha and/or balata.

In the specification of Patent No. 1,912,548 (Serial No. 322,572) there is described a submarine telephone or other signalling cable insulated with a material possessing a low leakance of under about 2 micro-micromhos per $cm^3$ at 1000 cycles and at 75° F. or a corresponding leakance of under 6 micro-micromhos per $cm^3$ at 2000 cycles and 32° F., and which comprises gutta percha and/or balata from which resins and dirt impurities have been removed by a purifying treatment.

The purified gutta percha and/or balata with which the above mentioned submarine signalling cable is insulated, is very hard and horny and it has been found that not only is a large amount of power consumed in applying it to the conductor, with a consequent heavy wear and tear of the machinery, but that great care and skill are required to obtain a sound insulating covering free from cracks and fissures.

In the co-pending application Serial No. 431,330, now United States Patent No. 1,989,563, dated January 29, 1935, the submarine telephone or other signalling conductor has an insulation comprising gutta percha and/or balata, purified as above, with which is intimately admixed rubber or synthetic rubber in proportions of up to 50% of the mixture.

As a result of this intimate incorporation of the rubber, the hardness of the purified gutta percha and/or balata is diminished.

In the specification of our application Serial No. 499,406, filed 1st December, 1930, now Patent 1,934,335, dated November 7, 1933, from which the present application is divided out, we have described an electrical insulating material comprising gutta percha and/or balata of low resin content intimately admixed with a semisolid refined petroleum product.

According to the present invention a submarine or other signalling conductor is provided with an insulation comprising gutta percha and/or balata of low resin content which has been softened and diluted by intimate admixture with a refined petroleum hydrocarbon of a viscid consistency that is intermediate between thin fluid and solid.

The insulation may consist of an intimate admixture of gutta percha and petroleum jelly or a less viscous hydrocarbon e. g. a heavy mineral oil of high flash point and low volatility at 100° C. may be employed.

In some cases raw rubber may be added to the mixture. The raw rubber may be natural rubber of good commercial quality, or it may first have been subjected to a purifying treatment, whereby its non-rubber constituents have been wholly or partially removed, or synthetic rubber may be used.

The gutta percha and/or balata may be subjected to any suitable process to remove the resins and in some cases it is desirable that the dirt be removed also as for example described in Patent No. 1,912,548 referred to above.

A suitable method of forming the intimate mixture of petroleum jelly and deresinated gutta percha consists in placing the gutta percha which has previously been heated and softened in a mixing machine and adding the petroleum jelly little by little at a low temperature such that the gutta percha just remains plastic and at such a rate that the mixture remains in coherent pieces, the mixing operation being continued until the petroleum jelly is intimately incorporated with the gutta percha. When the mixture also includes rubber, the latter is preferably first masticated and then incorporated in the gutta percha in the usual manner preferably before the addition of the petroleum jelly. Or, if desired, the rubber preferably after mastication, is well mixed with the petroleum jelly first and this mixture then added to and thoroughly mixed with the gutta percha in the way described above.

It is to be understood that where the gutta percha and/or balata contains an inappreciable resin content that the petroleum jelly or other petroleum product may be directly added thereto.

The principal advantage of the new insulating material is that the deresinated gutta percha is softened sufficiently by the addition of the petroleum jelly or of the petroleum jelly+rubber to make its application to the conductor simpler and that the insulated core is more easily obtained free from fissures and cracks.

When masticated rubber alone is used to soften the deresinated gutta percha, it tends to give a tacky product. A further advantage of the new insulating material is that this tendency is removed by the incorporation of the petroleum jelly owing to the greasy nature of the latter and also because of its preservative action on the gutta percha and rubber.

Other advantages accruing from the addition of the petroleum jelly are that the cost is thereby lowered and that the electrical properties are improved.

In the absence of rubber, the proportion of petroleum jelly to be added to the deresinated gutta percha will depend upon the hardness of the latter, the required degree of softness of the resultant insulating material and of course the amount of resin that has been removed or is present in the gutta percha. While the petroleum jelly content may be as low as 10% the combined percentage of resin and petroleum jelly present in the mixture may be made up to about 50% and good mechanical and electrical results have been obtained with mixtures of a hard deresinated gutta percha with up to 50% of petroleum jelly.

This figure is a limit from the practical point of view, if it is desired that the gutta percha shall be hard and firm when cold, with a softening point above the temperature likely to be met with in practice. Quantities of petroleum jelly in excess of 50% (e. g. a mixture of 20% gutta and 80% petroleum jelly) however, yield materials with valuable properties from the point of view of cable "compounds".

It has now been found that mixtures of gutta percha with more than 15% of petroleum jelly tend to "sweat", that is to say, they tend to exude in the course of time an oily layer on their surfaces. This phenomenon of sweating is commonly exhibited by balata containing its full complement of oily natural resins, which sweating can however, be entirely inhibited by subjecting the balata to a process of heat treatment as hereinafter described.

It has been found that, as in the case of balata containing its natural resins, so also with mixtures of gutta percha and/or balata and petroleum jelly, the sweating or exudation of the greasy layer on the outside surface can be prevented by subjecting the material to heat treatment. The existence or absence of sweating in these compositions containing petroleum jelly may be detected by examining the samples in ultra-violet light from which the visible rays have been screened. Thus when a sample of a composition comprising 40% of petroleum jelly and 60% of deresinated gutta percha is examined at intervals in ultra-violet light, the characteristic fluorescence of the petroleum product will be visible strongly on the surface after a few days if the material has not been heat-treated, while a heat treated but otherwise identical sample will remain unchanged, as far as can be at present ascertained, for an indefinite time.

In order therefore to render the materials in accordance with the invention satisfactorily permanent, it is desirable that they should be heat treated in accordance with the method described in the co-pending application of W. S. Smith et al Serial No. 413,398, filed 11th December 1929, now Patent 1,978,868, this method including subjecting the material to a heat treatment at a temperature below its limiting temperature, rapidly chilling the material, reheating it to the same temperature, and maintaining the material at this temperature until hardening occurs. This is more especially the case with those compositions of deresinated gutta percha and/or balata which comprise more than 15% of the admixed paraffin hydrocarbons.

It will be found that the heat treatment temperatures for mixtures of petroleum jelly and deresinated gutta percha or balata are substantially the same as those for the pure deresinated gutta percha or balata with no admixed material.

This is peculiar in that the ordinary gutta percha and/or balata with full complement of resin, or even partly deresinated will not stand so high a temperature without undue softening as will the deresinated material. It is thought that the petroleum jelly is not truly soluble in the deresinated material at temperatures below the softening point, or only to a slight extent, with the result that the gutta remains as a coherent and colloidal structure in which is dispersed the petroleum jelly. This condition is best obtained when the proper heat treatment has been carried out. These remarks are made merely by way of explanation, and in no way affect the facts.

As a consequence of this remarkable fact, the following very useful properties are exhibited by these materials:

1. A soft pliable mass at 70° C. more plastic than the deresinated gutta percha.
2. Setting firmly and quickly when the temperature is lowered and doing so nearly as rapidly and approximately at the same temperature as deresinated gutta percha.
3. When set, forming a substantially solid and firm body which though less tough than the deresinated gutta alone is yet harder than would be expected from the proportion of soft petroleum jelly added.

These remarks do not apply to those mixtures in which rubber is added. It seems that the rubber is soluble in the gutta, and the petroleum jelly in the rubber at temperatures below softening point, consequently softening the actual structure. The materials containing rubber therefore must have a special schedule of heat treatment worked out according to the method given in our co-pending application No. 413,398 (now Patent 1,978,868) referred to above.

When rubber is also present in the mixture, the proportion of petroleum jelly required to produce a certain degree of softness in a given sample of deresinated gutta percha will be diminished.

*Example 1*

|  | Leakance | Dielectric constant | Plasticity |
| --- | --- | --- | --- |
| Deresinated gutta percha | 6 | 2.86 | 50 divisions |
| The same sample of deresinated gutta percha + 10% vaseline. | 5 | 2.56 | 60 divisions |

Further examples of gutta percha+petroleum jelly:

Parts
2. Deresinated and dirt-free gutta percha____ 90
   Petroleum jelly_____ 10
3. Deresinated and dirt-free gutta percha____ 60
   Petroleum jelly_____ 40
4. Deresinated and dirt-free gutta percha____ 50
   Petroleum jelly_____ 20
   First quality plantation crepe I. R. deproteinized _____ 30
5. Deresinated balata_____ 75
   Petroleum jelly_____ 25

| No. | Dielectric constant | Leakance per cm. cube | Plasticity at 70° C. |
| --- | --- | --- | --- |
| 2 | 2.45 | 4.0 | 60 divisions |
| 3 | 2.4 | 3.0 | 80 divisions |
| 4 | 2.5 | 4.5 | 76 divisions |
| 5 | 2.5 | 5.5 | 69 divisions |

Nos. 2, 3 and 5 were heat treated as for dirt and resin-free gutta percha, i. e. heated slowly from 30° C. to 60° C. over a period of 24 hours. Nos. 1 and 4 were not heat treated.

In the above examples the value of the leakance is given in micromicromhos per centimetre cube at 2000 cycles and 32° F.

The plasticity was measured by the following method:—A ball, having a diameter of 1 cm. is moulded from the material to be tested, care being taken to see that the moulded object contains no air bubbles. The ball is placed under a weighted rod with a disc shaped end about 1.5 cm in diameter supported so that the latter just rests upon the ball and the apparatus is placed in a waterbath heated to 70° C. When the moulded ball has been heated right through to this temperature, the loaded rod is freed so that it can fall under its own weight, being retarded only by the resistance of the gutta percha ball. At the end of 10 seconds the depth of fall is measured by means of a second rod which carries a rack and engages with a pinion operating a needle that moves over a scale graduated in 180 divisions, and the depth of fall of the rod is therefore measured by observing the displacement of the needle.

The displacement of the needle in the ten seconds during which the loaded rod is free to fall is given here as the measure of the plasticity and obviously the higher the figure the softer is the material.

It will be understood that the term "gutta percha" of low resin content employed in the specification and claims includes in addition to the artificially deresinated guttas, certain kinds of raw gutta e. g. so called "leaf-gutta percha" possessing a naturally low resin content.

The petroleum products should be substantially free from ash and acidity and preferably they consist mainly of paraffin hydrocarbons.

The invention is illustrated in the accompanying drawing which is a sectional view of a submarine cable having continuous loading insulated in accordance with the invention.

Referring to the drawing, the cable comprises a central copper conductor 1 with the usual segmental copper tapes 2. Over the core is wound the usual loading indicated at 3 which is surrounded on both sides by a pressure equalizing medium 4.

The main insulation is made up of two layers 5 and 6 comprising deresinated gutta percha and petroleum jelly over which is applied jute servings 7 followed by armouring wires 8 and outer servings 9.

What we claim is:—

1. A signalling conductor provided with a substantially homogeneous sheath of insulation which is substantially solid and firm at ordinary temperatures and which comprises gutta percha of low resin content, with which is intimately admixed as a diluent not more than 50% of a refined petroleum product of an oily nature.

2. A signalling conductor provided with a substantially homogeneous sheath of insulation which is substantially solid and firm at ordinary temperatures and which comprises gutta percha of low resin content, with which is intimately admixed as a diluent not more than 50% of a semisolid refined petroleum product.

3. A signalling conductor provided with a substantially homogeneous sheath of insulation which is substantially solid and firm at ordinary temperatures and which comprises gutta percha of low resin content softened and diluted by admixture with rubber and not more than 50% of a semi-solid refined petroleum product.

4. A signalling conductor provided with a substantially homogeneous sheath of insulation which is substantially solid and firm at ordinary temperatures and which comprises gutta percha of low resin content with which is intimately admixed as a diluent not less than 10% and not more than 50% of a semi-solid refined petroleum product.

5. A signalling conductor having an insulation comprising gutta percha of low resin content with which is intimately admixed not less than 15% of petroleum jelly which mixture has been heat-treated to prevent sweating.

6. A signalling conductor having an insulation comprising gutta percha of low resin content with which is intimately admixed as a diluent not more than 40% of rubber and not more than 50% of a semi-solid refined petroleum product.

7. A signalling conductor provided with a substantially homogeneous sheath of insulation which is substantially solid and firm at ordinary temperatures and which comprises gutta percha of low resin content softened and diluted by admixture with rubber and from 15% to 50% of a semi-solid refined petroleum product which mixture has been heat-treated to prevent sweating.

8. A signalling conductor provided with a substantially homogeneous sheath of insulation which is substantially solid and firm at ordinary temperatures and which comprises gutta percha of low resin content, with which is intimately admixed as a diluent not more than 50% of a refined petroleum product of a viscid consistency that is intermediate thin fluid and solid.

WILLOUGHBY STATHAM SMITH.
HENRY JOSEPH GARNETT.
JOHN NORMAN DEAN.